United States Patent Office 3,165,396
Patented Jan. 12, 1965

3,165,396
DEFLECTION OF METAL VAPOR AWAY FROM THE VERTICAL IN A THERMAL EVAPORATION PROCESS
Edward J. Goon, Burlington, Paul L. Raymond, Beverly, and Robert W. Steeves, Nahant, Mass., assignors, by mesne assignments, to National Research Corporation, Cambridge, Mass., a corporation of Massachusetts
Filed Jan. 9, 1961, Ser. No. 81,312
6 Claims. (Cl. 75—.5)

This invention relates to the production of metals and more particularly to the production of extremely fine metal powders.

A principal object of the present invention is to provide an economical simple vacuum evaporation process for the production of metal powders.

Another object of the invention is to provide an improved process for the production of high purity metal powders having an extremely large surface area and low bulk density.

Another object of the invention is to provide a process of the above type for the production of high purity metal powders having a particle size of less than about 0.1 micron.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure and the scope of the application of which will be indicated in the claims.

Figure 1:
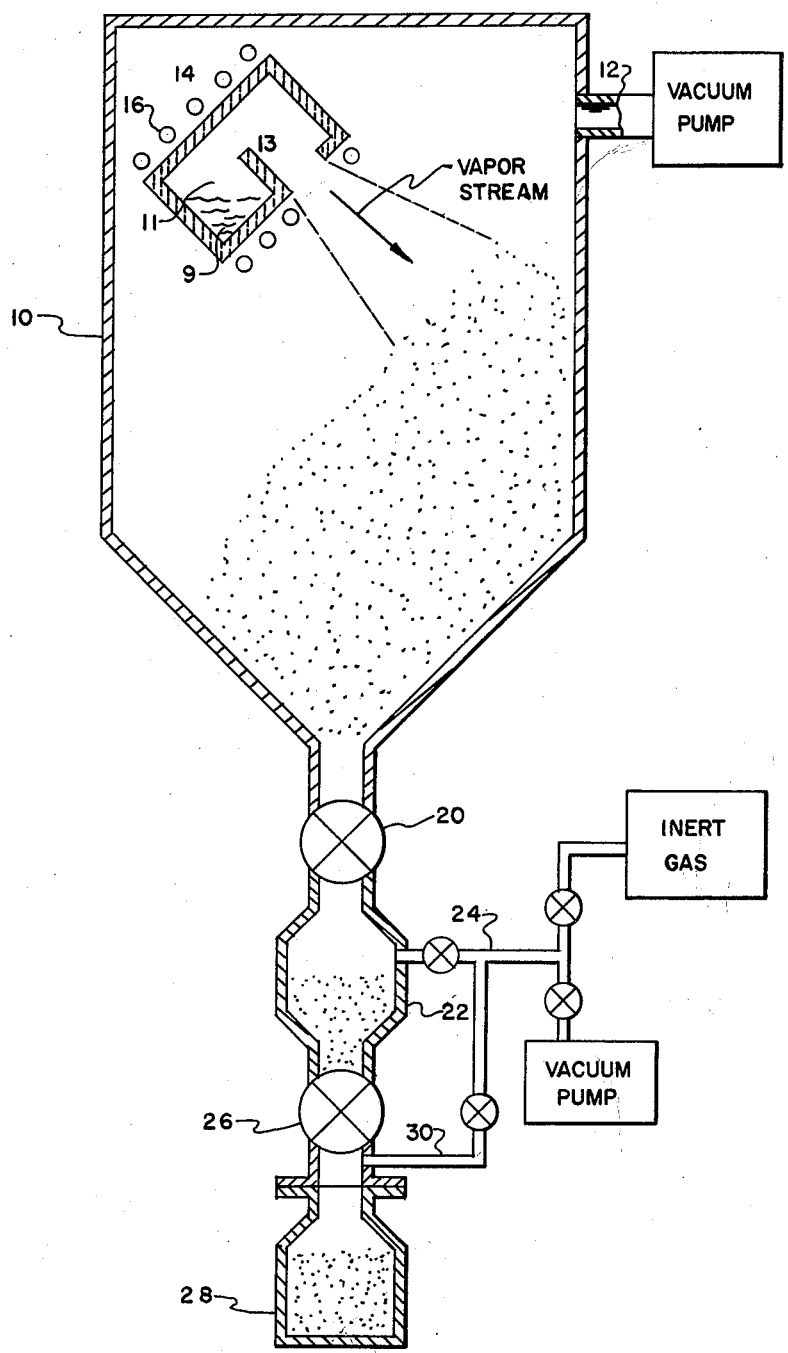
Figure 2:
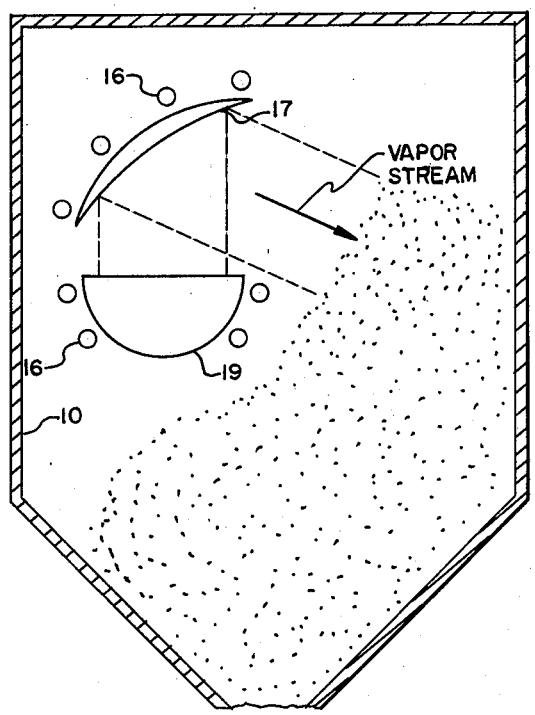

For a fuller understanding of the nature and objects of the invention, reference should be had to the following detailed description taken in connection with the accompanying drawings wherein:

FIG. 1 is a diagrammatic, schematic, sectional view of a preferred embodiment of the invention; and FIG. 2 which is a fragmentary, diagrammatic, schematic sectional view of an alternative embodiment of the invention.

In the copending application of Allen et al., Serial No. 757,537, filed August 27, 1958, there is disclosed a method of producing extremely fine metal powders. As described therein the process comprises the thermal evaporation of a metal at a pressure below about 500 microns and the condensation in free space under similar pressure conditions of the metal vapors produced. This condensation in the absence of oxidizing conditions gives a resulting product consisting of oxide free black spherical metal powders having a high purity and a particle size distribution such that substantially all of the particles have a diameter of less than about 0.1 micron. Aluminum powder so produced, for example, had a dry bulk density of 0.08 gram/cc. (fluffy) and 0.22 gram/cc. (tamped). Electron microscope photographs showed these powders to have a particle size within the range of 0.01 to 0.06 micron. The average particle size was approximately 0.03 micron.

The theoretical calculations of the surface area of such powders, assuming that they are spherical in shape, with a particle diameter of 0.03 micron, indicated a surface area of 74 square meters per gram. The actual surface area as measured by nitrogen adsorption techniques showed the surface area to be 13 square meters per gram. This difference in surface area was found to result from agglomeration of the particles.

By means of the present invention there is provided an improved process for producing fine metal powders having increased surface area and lower bulk density.

The present invention contemplates the thermal evaporation of a metal selected from the group consisting of aluminum, manganese, silver, zinc, magnesium, bismuth, titanium, zirconium, chromium, thorium, beryllium, copper, boron, silicon, iron and nickel at a pressure below about 500 microns, directing the resultant metal vapor stream which travels in a line of sight from the vapor generating source in a direction other than vertically upward, and then condensing the vapors in free space under similar pressure conditions of the metal vapors produced.

By directing the metal vapor stream in a direction other than vertically upward, the growth and/or agglomeration of the condensed metal powders is substantially reduced. Where the metal vapor stream is in an upward vertical direction, the metal powders which condense in free space in the vapor stream have a tendency to be temporarily supported by the vapor stream as they fall downwardly by gravity. Additionally, the condensed powder, as it falls downwardly into the vapor stream falls into an increasing concentration of the metal vapors emanating from the metal vapor source. The net result is that a substantial portion of the condensed powders tend to grow and/or agglomerate in the process of falling back through the vapor stream.

Where the metal vapor stream is directed in a direction other than vertically upward, preferably in a downward direction, the above-mentioned disadvantages are overcome.

In a downwardly directed vapor stream, the force of the vapor stream and the force of gravity combine to move the condensed particles in a direction of decreasing vapor concentration. Thus, the condensed particles fall away from the vapor stream and the tendency of the particles to grow and/or agglomerate is substantially reduced.

Where the vapor stream is directed laterally, the tendency of the condensed particles to agglomerate or grow is similarly substantially reduced. The force of gravity tends to pull the condensed powder out of the vapor stream. At the same time the condensing vapors are moving laterally in a direction of decreasing vapor stream concentration.

A downward flow of the metal vapor stream is preferably accomplished by deflecting the metal vapor stream which travels in a line of sight from the vapor generating source through a substantial angle to provide for a downwardly flow by impinging the flow of vapors on a deflecting surface. The downwardly deflected vapors are then condensed in free space.

This deflection of the metal vapors in a direction other than vertically upward prior to their condensation in free space produces an ultrafine metal powder which is substantially reduced in agglomeration and which has an increased surface area. The metal powders are then collected in a non-oxidizing or inert medium. The inert medium may comprise an organic material such as hexane, heptane, paraffin and the like which will form an oxidation inhibiting environment for the metal powders. The metal powders may also be collected in an inert gas filled container which is then sealed against leakage of oxygen or nitrogen.

The invention will now be more fully described in the following non-limiting example:

A crucible heated by an induction coil and suitably insulated therefrom was secured in a vacuum-tight tank so that a large free space existed between the crucible and the tank walls below the crucible. Aluminum metal was placed in a vapor generating source. The vapor generating source was constructed and arranged to have a crucible area for holding the aluminum metal charge to be vaporized and a deflecting surface area to deflect the aluminum vapors flowing in a line of sight from the crucible area to provide a downward flow of the aluminum vapors. Induction heating coils were provided to heat the deflecting surface area to a temperature on the order of the temperature of the aluminum vapors.

The tank was closed and evacuated to a pressure on the order of about 1 to 3 microns to remove most of the residual gases. During the evacuation the induction heating coils were energized and the aluminum brought up to melting temperatures. During this period the pressure was adjusted by bleeding in argon. When the desired pressure of 80 to 180 microns had been obtained, the aluminum melt temperature was raised to 1300° C. so as to cause evaporation of the aluminum. At the same time the temperature of the deflecting surface was raised to about 1300° C.

Visual inspection of the aluminum vapor stream showed that it flowed downwardly and condensed in the free space below the crucible and that the condensed metal collected at the bottom of the tank. The length of the condensing vapor stream was a function of the operating pressure; increasing in length and becoming more diffuse as the operating pressure was decreased. Upon completion of the aluminum evaporation and condensation in free space, the powder was collected in a container in the bottom of the tank. The tank and container were then flooded with argon and the container was sealed with a atmosphere of argon therein. The container was removed from the vacuum chamber and was filled with liquid heptane so that all of the powder was covered by the heptane.

The aluminum powder produced was pyrophoric, jet black in color and had a dry bulk density of less than 0.1 gram/cc. (fluffy) and about 0.1 gram/cc. (tamped). Determination of the surface area by nitrogen adsorption techniques showed that the powder had a surface area of 42.9 square meters per gram. When the aluminum powder was brought into contact with water spontaneous ignition of the powder resulted.

In addition to aluminum, high surface area ultra fine powders of nickel, manganese, silver, chromium, beryllium, copper, boron, silicon, iron, zinc, magnesium, bismuth, titanium, thorium, zirconium and other metals and metalloids can also be produced by thermal evaporation, deflection of the vapors thereof, and condensation in free space at pressures below about 500 microns.

The temperatures required for evaporating the metals, of course, depend upon the vapor pressure of the particular metal and the operating pressures employed. The temperature at which the evaporation is carried out determines the rate of metal vapors efflux from the source containing the molten metal. Temperatures at which the vapor pressure of the metal is below approximately 0.1 millimeter of mercury will yield low evaporation rates while higher temperatures and correspondingly higher metal vapor pressure will yield higher evaporation rates. The rates of evaporation which can be employed are quite broad and can be varied considerably.

The pressures of inert gas employed for the metal evaporation and condensation of the metal vapor are below about 500 microns and preferably between about 10 and 200 microns. The pressures employed can be obtained by evacuating the system to an extremely low pressure and then adjusting to a higher pressure with an inert medium such as argon, helium and the like. The length of the vapor stream emanating from the metal vapor source is largely dependent on the pressure employed. At the low pressures the vapor stream is long. As the operating pressure rises the length of the vapor stream decreases. Thus, when operating at any of the preferred pressures, it is essential that the free space between the metal vapor source and the surface opposite the direction of vapor flow be sufficiently large so that the metal vapors condense in the free space and not on the surface opposite. In the practice of the invention, it is preferable to operate at pressures which produce metal vapor streams which condense as billowing clouds in free space. Additionally, by operating at the pressure indicated metal powders substantially free of impurities such as oxygen are obtained.

The high purity metal powders produced have an average particle size of less than about 0.1 micron and a surface area per volume on the order of 4 square meters per cc. The metal powders, for the most part, are so very readily oxidized, when exposed to air or moisture, for example, that ignition occurs. When the high purity of the metal powders is to be retained, then the collection thereof which includes screening, if employed, storage, shipping and the like are conducted under non-oxidizing conditions. The various handling steps are carried out in inert mediums. For example, since the powders are produced in a substantially inert atmosphere, e.g., vacuum or inert gas, they can also be screened, packed and stored under vacuum conditions. The powders can also be handled and stored under an organic liquid or solid which will protect the powders from oxidation. Combinations of the various inert mediums described can be used too. For instance, the powder can be collected and screened under vacuum conditions and then stored and shipped in containers in a non-reactive organic liquid or solid.

As mentioned, the preferred method of handling the metal powders consists in collecting the powders in a liquid, organic material. After production the powders are wet down with a suitable liquid, organic material and handled as a wet cake or the powders can be processed as such and then collected in containers under a liquid, organic material of choice, e.g. hexane, heptane, benzene, naphtha and the like. The powders can also be collected and stored in a normally solid, organic material such as paraffin by maintaining the wax in the liquid phase during collection and then permitting it to solidify. In the wet state or where imbedded in an organic solid the powder is not pyrophoric and the bulk density is raised to a point where it can be inexpensively shipped. Oxygen contamination is also prevented.

The organic material to be used should possess certain properties. For instance, it should be non-reactive with the powders and should protect the powders from spontaneous ignition or oxidation. It should also be such that, if desired, it can be subsequently removed without affecting the agglomerate particle size or properties of the powders. It is obvious that there are many cases where the organic material selected is one which can be used with the powder in its applications or in the later processing of the powder so that it need not be removed.

Clearly, the number of organic materials which can be employed is enormous and the properties and suitability of any one can be readily determined from the standard texts.

One preferred type of apparatus for producing the metal powders in accordance with the invention is shown in FIG. 1 of the drawing wherein 10 represents a vacuum-tight tank or chamber which is evacuated through conduit 12 by means of a suitable pumping system. The lower portion of tank 10 is preferably funnel shaped for facilitating the collection and discharge of the metal powders within the tank. Within tank 10 there is a vapor source 14 which is constructed to provide a crucible area 11 for holding a charge of a metal 9, such as aluminum, to be melted and evaporated and a deflecting area 13 wherein the vapors are deflected at least once prior to their being condensed in free space. The vapor source 14 is suitably heated by means 16 illustrated as an induction heating means. The vapor source 14 is arranged so that the vapors are deflected, preferably downwardly, in tank 10 prior to condensation in free space.

In FIGURE 2 there is shown an alternative form of the vapor source for vaporizing and deflecting the metal vapors prior to condensation of such vapors in free space.

As illustrated in FIG. 2 the deflecting surface 17 may be separated from the crucible 19 and positioned above the crucible to provide for deflection of the metal vapors in a direction other than vertically upward prior to condensation in free space.

In the preferred embodiment of the invention the crucible and deflecting elements are preferably constructed of a refractory material having a boron nitride surface stratum. The refractory material is preferably a carbonaceous material. It can, however, be a refractory metal and, depending on the method of heating, can be a conductor or insulator. The base refractory material can be chosen from a wide number of metals and compounds, the principal requirement being that it be capable of withstanding the elevated temperatures required for metal vaporization and that it have in the case of aluminum metal, for example, a vapor pressure of less than 0.1 micron Hg abs. at 1500° C. Fabrication of such surface coated elements is preferably performed as described in the copending application of Baer et al., Serial No. 24,238, filed on April 25, 1960.

It should be emphasized that, while the vapor stream can be deflected in numerous directions, the distance between the vapor source and the tank wall in the direction of the deflected vapor stream is preferably such that even at low pressures the metal vapors condense in free space.

If continuous operations are desired, then suitable means (not shown) for feeding additional quantities of metal to the vapor source can be provided. The additional metal can be fed to the crucible in raw form as a ribbon, wire, pellet, powder or even as a liquid. Also, suitable means, such as vibrators, for removing powders collecting on the wall of the tank can also be provided. Likewise, tank 10 can also be provided with external cooling means if desired.

Valve means 20 is provided between the bottom of tank 10 and powder collecting chamber 22. A non-oxidizing medium is provided within chamber 22. This is preferably accomplished by evacuating chamber 22 through conduit 24 to a low pressure by means of a suitable vacuum pumping system. A source of inert gas can be provided for filling chamber 22 with any desired amount of such inert gas.

Valve means 26 is provided between collecting chamber 22 and storage or shipping receiver 28. Where ultimate purity of the product is required a valve similar to valve 26 can be attached to the receiver 28. A non-oxidizing medium is created within receiver 28 utilizing conduit 30 in the same manner as conduit 24. Suitable screening means, not shown, can be located between chamber 22 and receiver 28. If such screening means are employed then a plurality of receivers can be suitably coupled to collect the various sized metal powders.

The metal vapors condensing in free space settle to the lower portion of tank 10. Periodically, valve 20 is opened (valve 26 being closed) to permit an appreciable quantity of metal powder to fall into chamber 22 which is preferably maintained at a reduced pressure. Valve 26 is then opened (valve 20 being closed) to permit the powder to fall into receiver 28. Receiver 28 is either filled with an inert, organic liquid or inert gas or maintained under a reduced pressure. Screening of the metal powders as produced can be done at any point. Valve 26 is then closed and chamber 22 is then prepared for the next batch of powder. The receiver 28 is sealed and removed. A new receiver is placed into position and prepared for use.

The numerous uses of fine metal powders are well known. For example, fine metal powders have been used as catalysts, in pigment and powder metallurgical applications and where they possess pyrophoric properties as fuels in explosives, missiles and the like. In the present process the pyrophoric metal powders produced are of a high purity having a uniform particle size of less than 0.1 micron.

Since these ultrafine metal powders are substantially oxygen-free and have such tremendous surface areas, they possess unexcelled burning characteristics which make them especially useful as rocket and missile fuels. Additionally, because the pure metals produced according to the present process are uniformly smaller than the wavelength of the visible spectrum, they are jet black and thus perfect heat absorbers. Therefore, they find additional usefulness where excellent heat absorption is required or desired.

Since certain changes may be made in the above without departing from the scope of the invention herein involved, it is intended that all matter contained in the above description or shown in the accompanying drawing shall be interpreted as illustrative and not in a limiting sense.

What is claimed is:

1. The process for the production of high purity ultra fine metal powders having a surface area on the order of 4 square meters per cc. and a particle size of less than 0.1 micron comprising vaporizing a metal selected from the group consisting of aluminum, manganese, silver, chromium, beryllium, copper, boron, silicon, iron, nickel, zinc, magnesium, bismuth, titanium, zirconium, and thorium at a pressure below about 500 microns Hg abs., directing the resultant metal vapor stream in a direction sufficiently away from vertically upward to substantially completely prevent condensed powder from re-entering the metal vapor stream, condensing the resultant metal vapors in free space, said free space being maintained at a pressure below about 500 microns Hg abs., and collecting resultant metal powders.

2. The process for the production of high purity ultra fine metal powders having a surface area on the order of 4 square meters per cc. and a particle size of less than 0.1 micron comprising vaporizing a metal at a pressure below about 500 microns Hg abs., deflecting said metal vapors through a substantial angle to provide for a downwardly flow of vapors by impinging said flow of vapors on a deflecting surface, said deflecting surface being maintained at a temperature on the order of the temperature of the impinging vapors, condensing the resultant deflected metal vapors in free space at a pressure below about 500 microns whereby intermixing of said condensed metal powders with said metal vapors is substantially completely prevented and recovering the resultant metal powders in an inert medium.

3. The process for the production of high purity ultra fine aluminum powder having a surface area on the order of 4.3 square meters per cc. and a particle size of less than 0.1 micron comprising thermally evaporating aluminum at a temperature above about 1000° C. and at a pressure below about 500 microns Hg abs., deflecting said aluminum metal vapors through a substantial angle to provide for a downwardly flow of vapors by impinging said flow of vapors on a deflecting surface, condensing the resultant deflected aluminum metal vapors in free space, said free space being maintained at a pressure below about 500 microns Hg abs. and collecting the resultant aluminum powder.

4. In the process for the production of high purity ultra fine metal powders wherein a metal selected from the group consisting of aluminum, manganese, silver, chromium, beryllium, copper, boron, silicon, iron, nickel, zinc, magnesium, bismuth, titanium, zirconium and thorium is vaporized at a pressure below about 500 microns Hg abs., and condensed in free space which is maintained at a pressure below about 500 microns Hg abs., the improvement which comprises directing the metal vapor stream in a direction sufficiently away from vertically upward to substantially completely prevent condensed powder from reentering said metal vapor stream and condensing the metal vapors in free space to provide a metal powder having a surface area on the order of 4 square meters per cc. and a particle size of less than 0.1 micron.

5. The process for the production of high purity metal powders which comprises thermally evaporating a metal selected from the group consisting of aluminum, manganese, silver, chromium, beryllium, copper, boron, silicon, iron, nickel, zinc, magnesium, bismuth, titanium, zirconium and thorium at a pressure below about 500 microns Hg abs., deflecting said metal vapors through a substantial angle to provide for a downwardly flow of vapors by impinging said flow of vapors on a deflecting surface, said deflecting surface being maintained at a temperature on the order of the temperature of the impinging vapors, condensing the resultant deflected metal vapors in free space, said free space being maintained at a pressure below about 500 microns and collecting the resultant, spherical, high purity powders of a uniform particle size of less than about 0.1 micron in an inert medium.

6. The process of producing high purity ultra fine metal powders having a surface area on the order of 4 square meters per cc. and a particle size of less than 0.1 micron. comprising vaporizing a metal at a pressure below about 500 microns Hg abs., directing the resultant metal vapor stream in a downward direction to permit condensation of the metal vapors in a decreasing concentration of metal vapor with rapid removal of said condensed metal powder from said vapor stream, condensing the metal vapors in free space at a pressure below about 500 microns and collecting the resultant metal powders whereby said condensed powders do not remain in contact with said metal vapor stream sufficiently long to acquire substantial agglomeration and particle growth.

References Cited in the file of this patent

UNITED STATES PATENTS

| | | |
|---|---|---|
| 1,688,426 | Lannon | Oct. 23, 1928 |
| 2,055,195 | Dietz | Sept. 22, 1936 |
| 2,531,964 | Bean | Nov. 28, 1950 |
| 2,756,138 | Meister | July 24, 1956 |
| 2,935,394 | Hiler | May 3, 1960 |
| 3,049,421 | Allen et al. | Aug. 14, 1962 |

FOREIGN PATENTS

| | | |
|---|---|---|
| 634,799 | Great Britain | Mar. 29, 1950 |

OTHER REFERENCES

Harris: "A Method for the Evaporation of Alloys," Journal of Applied Physics, vol. 19, August 1948, pages 739–741.